US012118918B2

(12) United States Patent
Nam et al.

(10) Patent No.: US 12,118,918 B2
(45) Date of Patent: Oct. 15, 2024

(54) METHOD AND SYSTEM FOR TRANSMITTING DATA, TIMING CONTROLLER, AND SOURCE DRIVER CHIP

(71) Applicants: Beijing ESWIN Computing Technology Co., Ltd., Beijing (CN); Hefei ESWIN Computing Technology Co., Ltd., Hefei (CN)

(72) Inventors: Jangjin Nam, Beijing (CN); Dongmyung Lee, Beijing (CN); Donghoon Baek, Beijing (CN); Daejoon Lee, Beijing (CN)

(73) Assignees: Beijing ESWIN Computing Technology Co., Ltd., Beijing (CN); Hefei ESWIN Computing Technology Co., Ltd., Hefei (CN)

( * ) Notice: Subject to any disclaimer, the term of this patent is extended or adjusted under 35 U.S.C. 154(b) by 0 days.

(21) Appl. No.: 18/147,204

(22) Filed: Dec. 28, 2022

(65) Prior Publication Data

US 2023/0386388 A1 Nov. 30, 2023

(30) Foreign Application Priority Data

May 30, 2022 (CN) ........................ 202210601155.5

(51) Int. Cl.
*G09G 3/20* (2006.01)

(52) U.S. Cl.
CPC ....... *G09G 3/2096* (2013.01); *G09G 2370/08* (2013.01)

(58) Field of Classification Search
CPC .............. G09G 3/2096; G09G 2370/08; G06F 13/4022; G06F 13/4265
See application file for complete search history.

(56) References Cited

U.S. PATENT DOCUMENTS

2015/0187315 A1* 7/2015 Park ..................... G09G 3/3685 345/99
2017/0132966 A1* 5/2017 Lim ....................... G09G 5/008
(Continued)

FOREIGN PATENT DOCUMENTS

CN 108694917 A 10/2018
CN 109036317 A 12/2018
(Continued)

OTHER PUBLICATIONS

China National Intellectual Property Administration, First Office Action in Patent Application No. CN202210601155.5 issued on Sep. 11, 2023, which is a foreign counterpart application corresponding to this U.S. Patent Application, to which this application claims priority.
(Continued)

*Primary Examiner* — Towfiq Elahi
(74) *Attorney, Agent, or Firm* — Kolitch Romano Dascenzo Gates LLC

(57) ABSTRACT

Provided is a method for transmitting data. The method includes: transmitting equalization matching data to a source driver chip upon sending a link stable pattern to the source driver chip, wherein the equalization matching data is configured for the source driver chip to determine a target equalization gain, and perform gain compensation, based on the target equalization gain, on display data from the timing controller; and transmitting the display data to the source driver chip in response to a first condition being met, wherein the first condition is that the source driver chip determines the target equalization gain.

20 Claims, 5 Drawing Sheets

(56) References Cited

U.S. PATENT DOCUMENTS

| | | | |
|---|---|---|---|
| 2020/0090618 | A1 | 3/2020 | Guo et al. |
| 2020/0202816 | A1 | 6/2020 | Kim et al. |
| 2020/0251036 | A1 | 8/2020 | Kim et al. |
| 2021/0020136 | A1 | 1/2021 | Zhao |
| 2021/0343214 | A1 | 11/2021 | Kim et al. |

FOREIGN PATENT DOCUMENTS

| | | | |
|---|---|---|---|
| CN | 111354320 | A | 6/2020 |
| CN | 111477158 | A | 7/2020 |
| CN | 111508407 | A | 8/2020 |
| CN | 113570991 | A | 10/2021 |
| CN | 113936603 | A | 1/2022 |
| CN | 114220380 | A | 3/2022 |

OTHER PUBLICATIONS

China National Intellectual Property Administration, Notification to grant patent right for invention of Chinese application No. 202210601155.5 issued on Oct. 20, 2023, which is foreign counterpart application of this US application.

* cited by examiner

METHOD AND SYSTEM FOR TRANSMITTING DATA, TIMING CONTROLLER, AND SOURCE DRIVER CHIP

CROSS-REFERENCE TO RELATED APPLICATION

This application is based on and claims priority to Chinese Patent Application No, 202210601155.5, filed on May 30, 2022, entitled "METHOD AND SYSTEM FOR TRANSMITTING DATA, TIMING CONTROLLER, AND SOURCE DRIVER CHIP," and the disclosure of which is herein incorporated by reference in its entirety.

TECHNICAL FIELD

The present disclosure relates to the field of display technologies, and in particular, relates to a method and system for transmitting data, a timing controller, and a source driver chip.

BACKGROUND

A display device generally includes a display panel, and a drive circuit for driving the display panel. The drive circuit includes a timing controller (TCON) and a source driver (SD) chip, and data is transmitted between the timing controller and the source driver chip via a point-to-point (P2P) protocol.

SUMMARY

Embodiments of the present disclosure provide a method and system for transmitting data, a timing controller, and a source driver chip.

According to some embodiments of the present disclosure, a method for transmitting data is provided. The method is applicable to the timing controller, and includes:

- transmitting equalization matching data to a source driver chip upon sending a link stable pattern to the source driver chip, wherein the equalization matching data is configured for the source driver chip to determine a target equalization gain, and perform gain compensation, based on the target equalization gain, on display data from the timing controller; and
- transmitting the display data to the source driver chip in response to a first condition being met, wherein the first condition is that the source driver chip determines the target equalization gain.

In some embodiments, a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is transmitted, prior to transmitting the link stable pattern, by the timing controller to the source driver chip.

In some embodiments, the equalization matching data is transmitted by the timing controller upon being powered on or reset prior to transmitting the display data to the source driver chip.

In some embodiments, the equalization matching data is transmitted each time the timing controller transmits M frames of display data to the source driver chip, wherein M is an integer greater than 0.

In some embodiments, prior to transmitting the equalization matching data to the source driver chip, the method further includes: sending a first control instruction to the source driver chip, wherein the first control instruction instructs the source driver chip to perform automatic equalization; and/or

- upon transmitting the equalization matching data to the source driver chip, the method further includes: sending a second control instruction to the source driver chip, wherein the second control instruction indicates completion of transmission of the equalization matching data.

In some embodiments, the method further includes: sending, upon transmitting clock calibration data to the source driver chip, configuration information to the source driver chip over a data channel, wherein the configuration information is provided for the source driver chip to configure a physical layer parameter.

According to some embodiments, a method for transmitting data is provided. The method is applicable to a source driver chip, and includes:

- receiving equalization matching data from a timing controller upon receiving a link stable pattern;
- determining a target equalization gain by performing automatic equalization based on the equalization matching data;
- receiving display data from the timing controller; and
- performing gain compensation on the display data based on the target equalization gain.

In some embodiments, a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is received by the source driver chip prior to receiving the link stable pattern.

In some embodiments, determining the target equalization gain by performing the automatic equalization based on the equalization matching data includes: acquiring a plurality of gain compensated equalization matching data by performing gain compensation on the equalization matching data based on a plurality of reference equalization gains; determining error rates of the plurality of gain compensated equalization matching data; and determining the target equalization gain from the plurality of reference equalization gains based on the error rates of the plurality of gain compensated equalization matching data.

In some embodiments, prior to performing gain compensation on the equalization matching data based on the plurality of reference equalization gains, the method further includes: receiving equalization gain configuration information from the timing controller; and determining the plurality of reference equalization gains based on the equalization gain configuration information.

In some embodiments, the equalization gain configuration information includes N bit data, and a number of the plurality of reference equalization gains is equal to or less than 2 to the power of N, wherein N is an integer greater than 0.

In some embodiments, the method further includes: receiving, upon receiving clock calibration data, configuration information from the timing controller over a data channel, wherein the configuration information is provided for the source driver chip to configure a physical layer parameter.

According to some embodiments, a system for transmitting data is provided. The system for transmitting data includes a timing controller and a source driver chip. The timing controller is configured to perform corresponding processes in the above method for transmitting data, and the source driver chip is configured to perform corresponding processes in the above method for transmitting data.

According to some embodiments, a device for transmitting data is provided. The device for transmitting data includes a processor, a communication interface, a memory, and a communication bus; wherein the processor, the communication interface, and the memory communicate with each other by the communication bus. The memory is configured to store one or more computer programs, and the processor, when loading and running the one or more computer programs stored in the memory, is caused to perform the processes in the above method for transmitting data. The device for transmitting data includes a timing controller and/or a source driver chip.

According to some embodiments, a non-transitory computer-readable storage medium is provided. The non-transitory computer-readable storage medium stores one or more computer programs therein, wherein the one or more computer programs, when loaded and run by a processor, cause the processor to perform the processes in the above method for transmitting data.

According to some embodiments, a computer program product including one or more instructions is provided. The one or more instructions, when loaded and executed by a processor, cause the processor to perform the processes in the above method for transmitting data.

BRIEF DESCRIPTION OF THE DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION

To make the objectives, technical solutions, and advantages of the present disclosure clearer, the embodiments of the present disclosure are further described in detail hereinafter with reference to the accompanying drawings.

A display device generally includes a display panel, and a drive circuit for driving the display panel. The drive circuit includes a timing controller (TCON) and a source driver (SD) chip, and data is transmitted between the timing controller and the source driver chip via a point-to-point (P2P) protocol. Data from a timing controller to a source driver chip includes display data. During the process of transmitting the data, a signal for carrying the display data attenuates. Thus, the source driver chip is required to perform gain compensation on received display data based on equalization gain to ensure a display quality. How to address the issues related gain compensation of the source driver chip is challenge and appropriate gain compensation can significantly improve the display quality.

An implementation environment involved in the embodiments of the present disclosure is described before a method for transmitting data in the embodiments of the present disclosure is described in detail.

A display device generally includes a display panel, and a drive circuit for driving the display panel. The display device may be a liquid crystal display device, or a display device of other type. The method for transmitting data in the embodiments of the present disclosure is mainly applicable to the drive circuit included in the display device.

Figure 1:
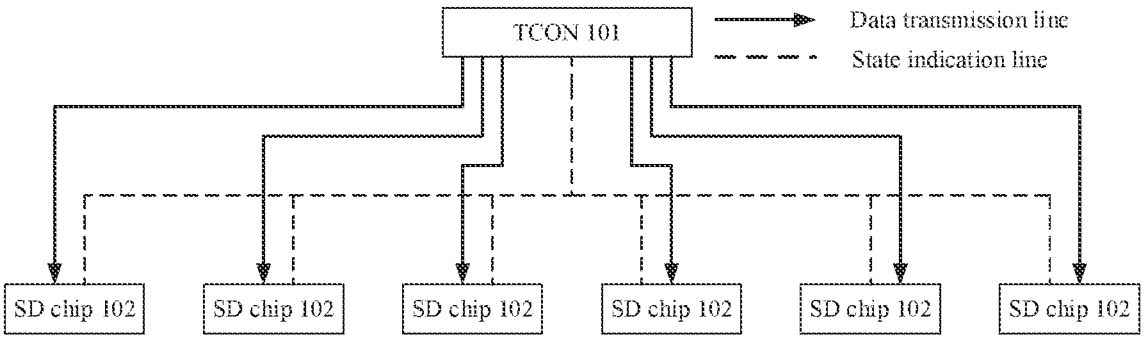
FIG. 1 is a system architecture diagram of a method for transmitting data according to some embodiments of the present disclosure.

As shown in FIG. 1, the drive circuit includes a timing controller 101 and a plurality of source driver chips 102. The drive circuit is equivalent to a system for transmitting data. One source driver chip 102 is configured to display image by driving one display region of the display panel, and the plurality of source driver chips 102 are capable of displaying image by driving a whole display region of the display panel. The timing controller 101 is in communication connection with each of the plurality of source driver chips 102 via a P2P protocol to interact data. For example, the P2P protocol is a clock-embedded high-speed point-to-point interface (CHPI) protocol.

It should be noted that, as shown in FIG. 1, the timing controller 101 is connected to each of the plurality of source driver chips 102 by a data transmission line (illustrated in solid line). In addition, the timing controller 101 is connected to each of the plurality of source driver chips 102 by a state indication line (illustrated in dash line). A signal in the data transmission line is a one-way transmission signal, and the one-way transmission signal is transmitted by the timing controller 101 to the source driver chip 102. A signal in the state indication line instructs whether the source driver chip 102 requires to be clock calibrated, that is, the signal in the state indication line indicates whether the source driver chip 102 is in a loss of lock.

In the related art, in a case that the timing controller 101 determines, based on the state indication line, that the source driver chip 102 requires to be clock calibrated, the timing controller 101 transmits clock calibration data to the source driver chip 102 by the data transmission line. After each of the source driver chips 102 completes clock calibration based on the clock calibration data from the timing controller 101, the timing controller 101 sequentially sends a link stable pattern and display data to the source driver chips 102.

During transmitting the display data, as the signal for carrying the display data attenuates, the source driver chip 102 is required to perform gain compensation on received display data based on the equalization gain, such that a display quality is ensured. In the related art, the equalization gain is manually set, and is not convenient to be adjusted upon being set. The set equalization gain is not capable of handling cases with continuously changed temperature, electromagnetic interference and the like, such that the display quality is not ensured.

To address these issues, a method for transmitting data is provided in the embodiments of the present disclosure, and the method is configured to achieve an automatic equalization function. In the method, the timing controller transmits, upon sending the link stable pattern to the source driver chip, equalization matching data to the source driver chip, and the source driver chip performs automatic equalization based on the received equalization matching data, such that changes of the temperature, electromagnetic interference are considered and the data equalization is performed accordingly, thereby ensuring the display quality.

The method for transmitting data in the embodiments of the present disclosure are described in detail hereinafter.

Figure 2:
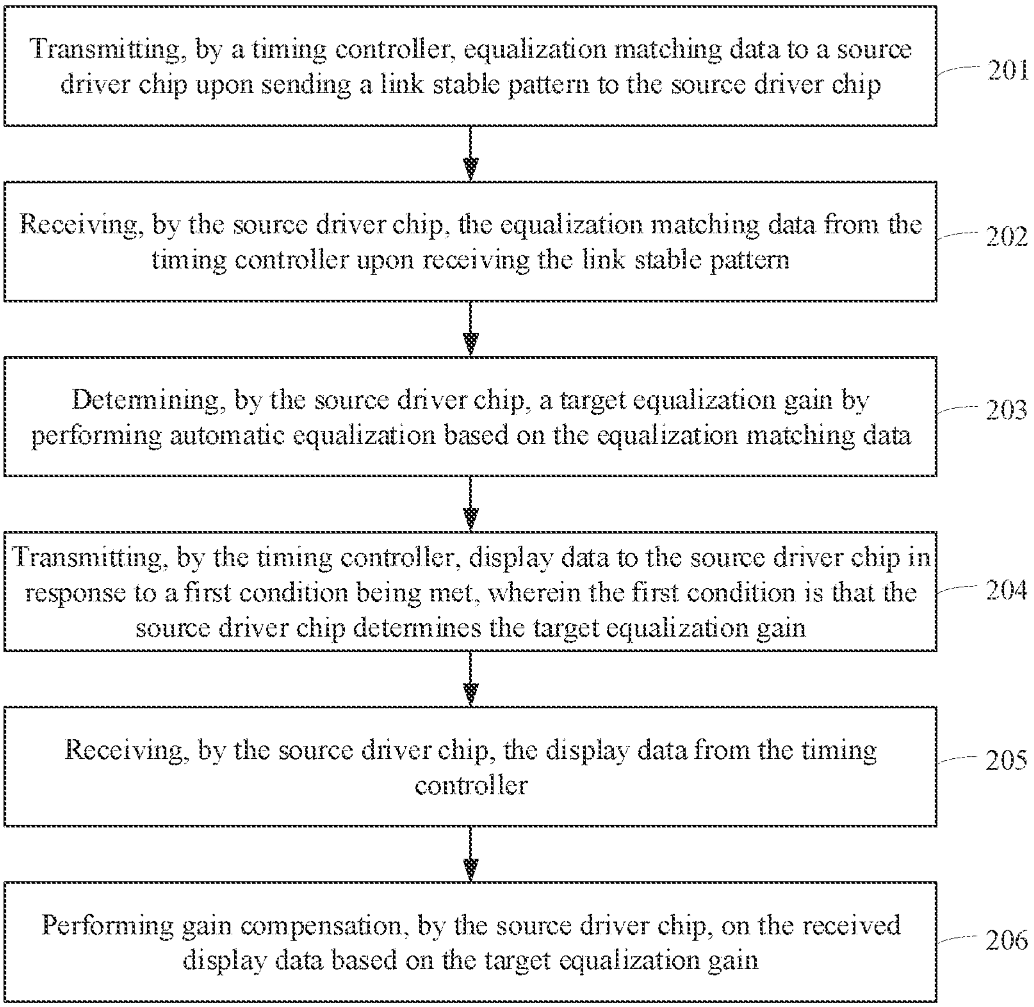
FIG. 2 is a flow chart of a method for transmitting data according to some embodiments of the present disclosure.

FIG. 2 is a flow chart of a method for transmitting data according to some embodiments of the present disclosure. Referring to FIG. 2, the method includes following processes.

In S201, a timing controller transmits equalization matching data to a source driver chip upon sending a link stable pattern to the source driver chip.

In S202, the source driver chip receives the equalization matching data from the timing controller upon receiving the link stable pattern.

In the embodiments of the present disclosure, the timing controller transmits the equalization matching data to the source driver chip after sending the link stable pattern to the source driver chip, thereby ensuring a property of automatic equalization. The link stable pattern instructs the source driver chip to perform phase deviation correction and scrambling reset, such that a link stabilization state is ensured for subsequent reception of the display data. The equalization matching data is configured for the source driver chip to perform automatic equalization, such that a target equalization gain is determined. The target equalization gain is configured for the source driver chip to perform gain compensation on the display data from the timing controller, thereby ensuring the display quality. It can be seen that, in the embodiments of the present disclosure, the equalization matching data is transmitted after sending the link stable pattern, such that the automatic equalization is performed in the link stabilization state, thereby ensuring the property of automatic equalization.

In the embodiments of the present disclosure, the timing controller transmits the link stable pattern and the equalization matching data to the source driver chip by the data transmission line. By taking one source driver chip as an example, the data transmission line between the timing controller and the source driver chip includes at least one pair of differential signal lines. Each of the at least one pair of differential signal lines is one data channel for transmitting one pair of differential signals. The timing controller transmits the link stable pattern and the equalization matching data to the source driver chip over each of the data channels or one data channel between the timing controller and the source driver chip, which is not limited in the embodiments of the present disclosure.

It can be seen from the above description that, prior to sending the link stable pattern to the source driver chip, the timing controller also transmits the clock calibration data to the source driver chip. Correspondingly, prior to receiving the link stable pattern, the source driver chip receives the clock calibration data from the timing controller. The clock calibration data instructs the source driver chip to perform clock calibration, thereby ensuring synchronization with a clock of the timing controller. In some embodiments, the source driver chip includes a clock data recovery (CDR) circuit, and the source driver chip recovers a clock signal synchronous with the timing controller from the clock calibration data by the CDR circuit, thereby ensuring synchronization with the clock of the timing controller.

In the embodiments of the present disclosure, the state indication line is connected between the timing controller and each of the source driver chips. Upon the timing controller and the source driver chip being powered on or reset, the timing controller determines whether the source driver chip requires to be clock calibrated by detecting a voltage state of the state indication line. In a case that the source driver chip requires to be clock calibrated, the timing controller transmits the clock calibration data to each of the source driver chips by the data transmission line. Upon receiving the clock calibration data from the timing controller, each of the source driver chips recovers a data clock from the clock calibration data, such that the clock signal synchronous with the timing controller is acquired.

In some embodiments, the state indication line is a single-ended signal line for indicating whether the source driver chip 102 is in a loss of lock. For example, the state indication line is a single-ended signal line pointed from the source driver chip to the timing controller. Upon the timing controller and the source driver chip being powered on or reset, the state indication line is in a first voltage state by default. In a case that the timing controller detects that the state indication line is in the first voltage state, the timing controller transmits the clock calibration data to each of the source driver chips by the data transmission line. The first voltage state indicates the loss of lock, and the first voltage state is a high voltage state or a low voltage state, which is not limited in the embodiments of the present disclosure.

By taking one of the source driver chips as an example, the data transmission line between the timing controller and the source driver chip includes at least one pair of differential signal lines. Each pair of differential signal lines is one data channel for transmitting one pair of differential signals. The timing controller transmits the clock calibration data to the source driver chip over each data channel or one data channel between the timing controller and the source driver chip, which is not limited in the embodiments of the present disclosure.

A signal for carrying the clock calibration data is a signal that is relatively stationary, clean, and regular, thereby ensuring a property of clock calibration. A signal for carrying the equalization matching data is a relatively irregular signal capable of simulating a case with poor quality signal, thereby ensuring a property of automatic equalization. On this basis, in the embodiments of the present disclosure, a number of clock edges in a unit time in the signal for carrying the equalization matching data is greater than a number of clock edges in the unit time in the signal for carrying the clock calibration data. For brevity, a transition density of the equalization matching data is greater than a transition density of the clock calibration data. The clock edge includes a rising edge and a falling edge, and the transition density represents a number of the clock edges in the unit time.

As an effect of the automatic equalization performed in a stabilized link state is better, automatic equalization data is required to be transmitted after sending the link stable pattern. In a case that transition densities of signals received by the source driver chip change sharply, a circuit of the source driver chip is strongly affected, and the received signals cannot be processed properly. Thus, a transition density of the link stable pattern is between the transition density of the equalization matching data and the transition density of the clock calibration data, such that a case of sharply changed transition density is reduced or mitigated by the link stable pattern, and the automatic equalization can be properly performed by the source driver chip.

Based on the above description, in the embodiments of the present disclosure, the number of clock edges in the unit time in the signal for carrying the equalization matching data is greater than a number of clock edges in the unit time in a signal for carrying the link stable pattern, and the number of the clock edges in the unit time in the signal for carrying the link stable pattern is greater than the number of clock edges in the unit time in the signal for carrying the clock calibration data.

In some embodiments, the clock calibration data is a design in the point-to-point protocol. For example, the clock calibration data includes a plurality of repetitive clock calibration sequences, and one of the plurality of clock calibration sequences is one data package from the timing controller. In some embodiments, each of the plurality of clock calibration sequences is a 10-bit binary sequence of ‘0000011111.’ It can be seen that clock edges in the clock calibration sequence are less, and each data package includes two clock edges averagely which are one raising edge and one falling edge. The raising edge corresponds to a switch from ‘0’ to ‘1’ in each of the plurality of clock calibration sequences, and the falling edge corresponds to a switch from ‘ l’ to ‘0’ between two adjacent clock calibration sequences.

In some embodiments, the link stable pattern is also a design in the point-to-point protocol. For example, the link stable pattern includes a first start identification code and a plurality of repetitive link check sequences. Each of the plurality of link check sequences includes a plurality of link check sub-sequences, and the plurality of link check sub-sequences are binary sequences. Each of the plurality of link check sub-sequences includes 10-bit data, and one of the plurality of link check sub-sequences is one data package from the timing controller.

In some embodiments, the link stable pattern includes two K-codes and eight link check sequences. Two K-codes are K2-code and K3-code, wherein the K2-code is the first start identification code. Each of the eight link check sequences includes four sequential data packages. For example, the four sequential data packages are 0xea, 0xeb, 0xec, and 0xed. In some embodiments, the link stable pattern starts from the K2-code, followed by at least one data unit, and the K3-code is inserted between any two data packages following at least one link check sequence to instruct resetting of the scrambling function. In some embodiments, data packages, other than the K-codes, in the link stable pattern are coded in a 8B/10B coding mode.

It should be noted that, the timing controller can at least repetitively send the link stable pattern to the source driver chip for five times with a duration of at least one microsecond.

In some embodiments, the equalization matching data includes a second start identification code and a matching sequence. The matching sequence includes a plurality of equalization matching units, and the plurality of equalization matching units may be same or different. The embodiments of the present disclosure illustrate by taking the plurality of equalization matching units being same as an example. One equalization matching unit includes a plurality of equalization matching sub-sequences. In some embodiments, the equalization matching data is a binary sequence, and each of the plurality of the equalization matching sub-sequences is a 10-bit binary sequence. One equalization matching sub-sequence is a data package from the timing controller.

In some embodiments, a number of clock edges in each clock calibration sequence in the clock calibration data is less than a number of clock edges in each link check sub-sequence in the link stable pattern, and the number of clock edges in each link check sub-sequence in the link stable pattern is less than a number of clock edges in each equalization matching sub-sequence in the equalization matching data. It should be noted that, in the embodiments, lengths of each clock calibration sequence, each link check sub-sequence, and each equalization matching sub-sequence are equal, for example, 10-bit binary sequence. Time corresponding to the 10-bit binary sequence is the unit time.

In some embodiments, assuming that a number of sequentially adjacent 1 in the clock calibration data is greater than or equal to a, and a number of sequentially adjacent 0 in the clock calibration data is greater than a, a number of sequentially adjacent 1 in the check sequence in the link stable pattern is less than a and greater than b, and a number of sequentially adjacent 0 in the check sequence in the link stable pattern is less than a and greater than b, then, a number of sequentially adjacent 1 in the matching sequence in the equalization matching data is less than or equal to b. In some embodiments, a is equal to 5, and b is equal to 3. It should be noted that, in the embodiments, the transition density of the equalization matching data is ensured to be greater by ensuring a smaller number of sequentially adjacent 1 or 0 in the equalization matching data.

In some embodiments, the second start identification code in the equalization matching data is an identification code different from that in the current point-to-point protocol. For example, the second start identification code is KEQ shown in FIG. 3. The second start identification code is a K-code, wherein the K-code includes four start identification sub-codes. One start identification sub-code includes 10-bit data, and one start identification sub-code is one data package.

Figure 3:
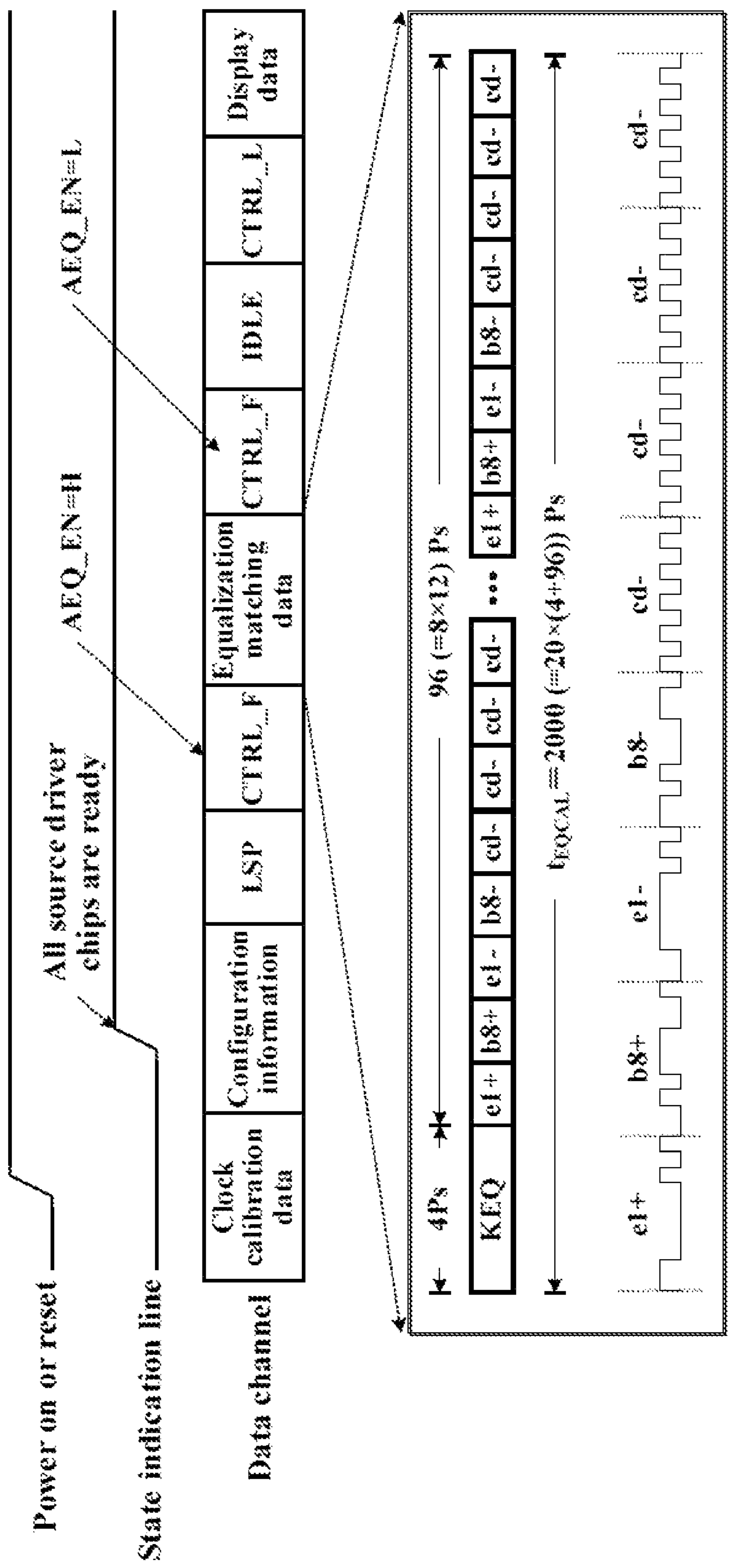
FIG. 3 is a schematic diagram of transmitting data by a timing controller according to some embodiments of the present disclosure.

In some embodiments, any equalization matching unit in the matching sequence in the equalization matching data includes ‘e1+, b8+, e1−, b8−, cd−, cd−, cd−, cd−’ shown in FIG. 3, or ‘e1−, b8−, e1+, b8+, cd+, cd+, cd+, cd+,’ or other sequence with great transition density. The ‘e1+’ represents a 10-bit binary sequence acquired by coding ‘0xe1’ in the 8B/10B coding mode, the ‘e1−’ represents a 10-bit binary sequence acquired by coding ‘0xe1’ in the 8B/10B coding mode and inverting, wherein the ‘0x’ represents hexadecimal. The ‘e1+’ represents a data package, and one equalization matching unit includes eight data packages. In the embodiments, the matching sequence includes 12 equalization matching units, that is, 96 (8*12) data packages.

The 100 data packages consisting of KEQ and 12 equalization matching units shown in FIG. 3 may be repetitively transmitted, thereby further improving the property of automatic equalization. That is, the equalization matching data from the timing controller includes a plurality of repetitive second start identification codes and matching sequences.

It can be seen from the above description that, the timing controller sequentially transmits the clock calibration data, the link stable pattern, and the equalization matching data to the source driver chip, such that sharply changed transition density is reduced, thereby ensuring the properties of clock calibration and automatic equalization. It should be noted that, even if the transition density of the equalization matching data is less, the clock calibration data, the link stable pattern, and the equalization matching data are transmitted in this sequence by the timing controller.

In the embodiments of the present disclosure, the timing controller transmits the equalization matching data to the source driver chip in different occasions, such that changes of the temperature, electromagnetic interference of the display panel in the current environment are handled by performing automatic equalization.

In some embodiments, the timing controller transmits the equalization matching data to the source driver chip upon being powered on or reset prior to transmitting the display data to the source driver chip, and/or, the timing controller transmits the equalization matching data to the source driver chip each time the timing controller transmits M frames of display data. That is, the equalization matching data is transmitted by the timing controller after being powered on or reset prior to transmitting the display data to the source driver chip, and/or, the equalization matching data is transmitted each time the timing controller transmits M frames of display data to the source driver chip. M is an integer greater than 0.

For example, upon being powered on or reset, the timing controller sequentially transmits the clock calibration data, the link stable pattern, and the equalization matching data to the source driver chip, to perform first automatic equalization. After the first automatic equalization is completed, the timing controller transmits a first frame of display data to the source driver chip. Then, each time the timing controller transmits M frames of display data, the timing controller sequentially transmits the clock calibration data, the link stable pattern, and the equalization matching data to the source driver chip prior to transmitting a next frame display data, such that automatic equalization is performed again.

In some embodiments, M is equal to 1, 8, 16, or the like. To some extent, the less the M, the relatively greater the property of automatic equalization. The greater the M, the less the power consumption of the timing controller and the source driver chip.

Figure 4:
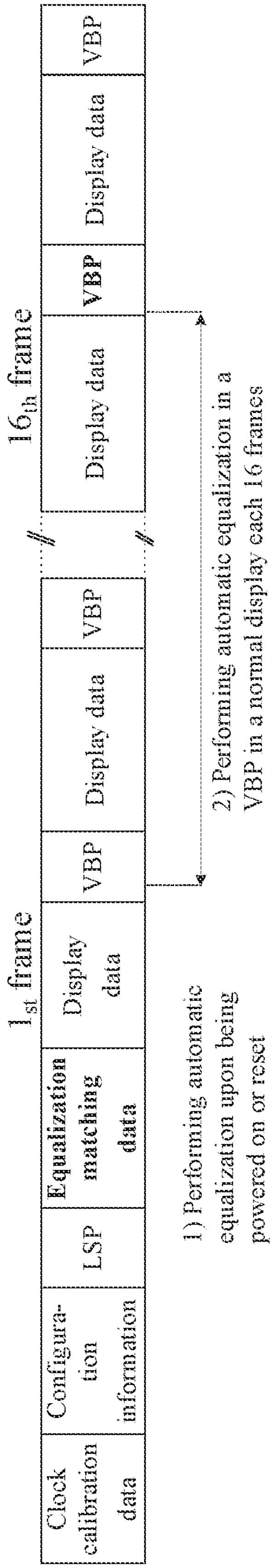
FIG. 4 is another schematic diagram of transmitting data by a timing controller according to some embodiments of the present disclosure.

FIG. 4 is another schematic diagram of transmitting data by a timing controller according to some embodiments of the present disclosure. Referring to FIG. 4, upon being powered on or reset, the timing controller sequentially transmits the clock calibration data, configuration information, the link stable pattern, and the equalization matching data, and then transmits the first frame of display data. Then, each time the timing controller transmits 16 frames display data, the timing controller sequentially transmits the clock calibration data, the configuration information, the link stable pattern, and the equalization matching data to the source driver chip in a vertical blank phase (VBP) between two adjacent frames of display data. In VBP between other two adjacent frames of display data, the timing controller sequentially transmits the clock display data and the link stable pattern, but does not transmit the equalization matching data.

It should be noted that, the configuration information is provided for the source driver chip to configure a physical layer parameter. In some embodiments, the configuration information includes equalization gain configuration information, wherein the equalization gain configuration information is configured for the source driver chip to determine a plurality of reference equalization gains, which are described in detail in following S203. In addition, in the VBP between two adjacent frames, the timing controller and the source driver chip first enter into a low power consumption mode, and the timing controller then transmits the clock calibration data to the source driver chip to awake the source driver chip. The low power consumption mode is optional.

In some embodiments, the timing controller transmits the equalization matching data to the source driver chip upon detecting that a temperature of the display panel is not within a predetermined range. The predetermined range is a range from 10° C. to 50° C., or other range. In some embodiments, the timing controller transmits the equalization matching data to the source driver chip upon detecting that a data transmission speed exceeds a predetermined speed. The predetermined speed is a speed within a range from 2.5 Gbps to 4 Gbps or other range.

In some embodiments, the timing controller sends a first control instruction to the source driver chip prior to transmitting the equalization matching data to the source driver chip. The first control instruction instructs the source driver chip to perform automatic equalization. That is, the timing controller enables the automatic equalization function by the first control instruction, and notifies the source driver chip of the start of the equalization matching data.

In some embodiments, the timing controller sends a second control instruction to the source driver chip upon transmitting the equalization matching data to the source driver chip. The second control instruction indicates completion of transmission of the equalization matching data. That is, the timing controller disenables the automatic equalization function by the second control instruction, and notifies the source driver chip of the end of the equalization matching data.

In some embodiments, the first control instruction is a frame control instruction, that is, CTRL_F in the point-to-point protocol. The frame control instruction carries first indication information, and the first indication information instructs the source driver chip to perform automatic equalization. It should be noted that, the first control instruction is acquired by extending CTRL_F in the embodiments of the present disclosure.

In some embodiments, the first control instruction includes an automatic equalization enable field, and the automatic equalization enable field is configured to carry the first indication information. In some embodiments, the automatic equalization enable field is acquired by defining any reserved field in CTRL_F.

Similarly, in the embodiments of the present disclosure, the second control instruction is a frame control instruction. The frame control instruction carries second indication information, and the second indication information indicates completion of transmission of the equalization matching data. The second control instruction includes an automatic equalization enable field, and the automatic equalization enable field is configured to carry the second indication information.

In some embodiments, the automatic equalization enable field is acquired by extending one reserved field in CTRL_F. The automatic equalization enable field is denoted as AQE_EN shown in FIG. 3. In a case that the AQE_EN is equal to H, the automatic equalization is performed, that is, the automatic equalization function is enabled. In a case that the AQE_EN is equal to L, the transmission of the equalization matching data is completed, that is, the automatic equalization function is disenabled. 'H' represents a binary sequence of all 1, and 'L' represents a binary sequence of all 0. For example, 'H' is '111,' and 'L' is '000.'

It should be noted that, a bit number occupied by the first indication information or the second indication information in the automatic equalization enable field is not limited in the embodiments of the present disclosure.

In FIG. 3, the timing controller sequentially transmits CTRL_F, EQ pattern, and CTRL_F upon sending the link stable pattern. A first CTRL_F is the first control instruction representing the start of automatic equalization, and a second CTRL_F is the second control instruction representing completion of transmission of the equalization matching data (EQ pattern).

In addition, in FIG. 3, the 'power on' is in a high voltage state and represents that the timing controller and the source driver chip are powered on. The 'reset' is in a high voltage state and represents that the timing controller and the source driver chip are reset. Idle (IDLE) data and a row control instruction (CTRL_L) are sequentially followed the second CTRL_F. 4Ps represents four data packages, and 96Ps represents 96 data packages.

In S203, the source driver chip determines a target equalization gain by performing automatic equalization based on the equalization matching data.

In the embodiments of the present disclosure, the equalization matching data from the timing controller may suffer from signal attenuation, error, and the like in transmitting. The source driver chip determines the target equalization gain by performing, upon receiving the equalization matching data, automatic equalization based on the received equalization matching data. It should be noted that, an error rate of data acquired by performing gain compensation the received equalization matching data based on the target equalization gain is relatively low.

One implementation of the source driver chip determining the target equalization gain by performing automatic equalization based on the equalization matching data includes: acquiring a plurality of gain compensated equalization matching data by performing gain compensation on the equalization matching data based on a plurality of reference equalization gains; determining error rates of the plurality of gain compensated equalization matching data, and determining the target equalization gain from the plurality of reference equalization gains based on the error rates of the plurality of gain compensated equalization matching data. For example, the source driver chip determines a reference equalization gain with a lowest error rate in the plurality of reference equalization gains as the target equalization gain. For brevity, gain compensation effects in the plurality of reference equalization gains is represented by the error rates by the source driver chip, and a reference equalization gain with optimal gain compensation effect is determined as the target equalization gain.

In some embodiments, the source driver chip receives equalization gain configuration information from the timing controller prior to performing gain compensation on the equalization matching data based on the plurality of reference equalization gains. The source driver chip determines the plurality of reference equalization gains based on the equalization gain configuration information.

In some embodiments, the equalization gain configuration information from the timing controller includes one reference equalization code, wherein the reference equalization code corresponds to one equalization gain. The source driver chip acquires a basic equalization gain by determining, based on the equalization gain configuration information, an equalization gain corresponding to the reference equalization code from a plurality of stored equalization gains corresponding to a plurality of equalization codes. The source driver chip determines the plurality of reference equalization gains based on the basic equalization gain.

The equalization gain configuration information includes N bit data, and a number of the plurality of reference equalization gains is equal to or less than a power of two ($2^N$). N is an integer greater than 0. That is, the reference equalization code includes N bit data.

In some embodiments, N is equal to 3. The reference equalization code includes 3-bit data, and the number of the plurality of reference equalization gains is equal to 8, or less than 8. For example, there is eight possible reference equalization codes, that is, '000' to '111.' Each of the possible reference equalization codes corresponds to one equalization gain, and the eight possible reference equalization codes correspond to eight equalization gains. For example, the eight equalization gains are sequentially 0 dB, 2 dB, . . . , 14 dB, that is, a step of the eight equalization gains is 2 dB. The source driver chip checks the eight equalization gains to acquire a target equalization gain with greatest gain compensation effect from a greater range of equalization gains.

Generally, the equalization gain corresponding to the reference equalization code from the timing controller is of better property empirically. Therefore, while ensuring the property of automatic equalization, some of the above eight equalization gains are checked to accelerate the speed of automatic equalization.

For example, in the case that the reference equalization code is '011,' and an equalization gain corresponding to '011' is 6 dB, the source driver chip determines three equalization gains corresponding to '011' and '011'±1 as three reference equalization gains. The three reference equalization gains are checked, wherein the three reference equalization gains are 4 dB, 6 dB, and 8 dB. Or, the source driver chip determines five equalization gains corresponding to '011', '011'±1 and '011'±2 as five reference equalization gains. The five reference equalization gains are checked, wherein the five reference equalization gains are 2 dB, 4 dB, 6 dB, 8 dB, and 10 dB.

It can be seen from the above description that, the timing controller, upon transmitting clock calibration data to the source driver chip, transmits configuration information to the source driver chip over a data channel, thereby ensuring the stability of data transmitting. The configuration information is provided for the source driver chip to configure the physical layer parameter. As shown in FIG. 3 and FIG. 4, the timing controller transmits the configuration information to the source driver chip upon transmitting the clock calibration data and prior to sending the link stabilization sequence.

In some embodiments, the configuration information includes the equalization gain configuration information, wherein the equalization gain configuration information is provided for the source driver chip to configure equalization gain of an equalizer (EQ). EQ is a device for calibrating an amplitude-frequency characteristic and a phase-frequency characteristic of the data channel. That is, in the embodiments of the present disclosure, the source driver chip compensates the amplitude, frequency, and phase of the received equalization matching data based on the above reference equalization gains by EQ, and then determines the target equalization gain base on the error rate of the compensated equalization matching data. Then, the source driver chip performs gain compensation on received display data based on the target equalization gain by EQ, thereby reducing the error rate of the display data.

In some embodiments, the configuration information further includes at least one of drive current configuration information, clock data recovery loop bandwidth configuration information, terminal resistance configuration information, and transmission speed configuration information of the source driver chip. The drive current configuration information is provided to configure a drive current of a high-speed receiver in the source driver chip, thereby greatly matching with the data transmission speed. The clock data recovery loop bandwidth configuration information is provided to configure a loop bandwidth of a clock data recovery circuit in the source driver chip, thereby improving the property of clock calibration. The terminal resistance configuration information is provided to configure a terminal resistance in the source driver chip, wherein the terminal resistance is resistance matched with a transmission resistance in the timing controller and a resistance in the data transmission line, thereby improving the quality of transmitting signal. The transmission speed configuration information is provided to configure a data transmission speed of the data channel between the timing controller and the source driver chip.

In some embodiments, the source driver chip stores an equalization configuration parameter. The equalization configuration parameter includes the plurality of reference equalization gains, and the source driver chip acquires the plurality of reference equalization gains from the equalization configuration parameter upon receiving the equalization matching data. It should be noted that, in these embodiments, the timing controller may not send the equalization gain configuration information to the source driver chip. In some embodiments, the timing controller sends the configuration information to the source driver chip over the data channel, wherein the configuration information does not include the equalization gain configuration information. In some other embodiments, the timing controller does not send the configuration information to the source driver chip.

It should be noted that, the source driver chip stores the equalization matching unit in the equalization matching data. Upon performing gain compensation on the received equalization matching data, the source driver chip acquires the error rate of the gain compensated equalization matching data by comparing, in a bit-wise manner, each equalization matching unit in the gain compensated equalization matching data with the stored equalization matching unit.

It can be seen from the above description that the timing controller can repetitively transmit the second start identification codes and matching sequences. Assuming that the second start identification codes and matching sequences transmitted each time include 100 data packages, the 100 data packages are repetitively transmitted r times, and the 100 data packages transmitted each time are configured to check properties of K reference equalization gains, a total checking time $t_{EQCAL}$ is equal to K*r*time of the 100 data packages. r is an integer not less than 1, K is an integer not less than 2. As shown in FIG. 3, r is equal to 4, K is equal to 5, and $t_{EQCAL}$ is equal to 2000 packages.

In S204, the timing controller transmits the display data to the source driver chip in response to a first condition being met, wherein the first condition is that the source driver chip determines the target equalization gain.

In the embodiments of the present disclosure, the timing controller transmits the display data to the source driver chip in response to the first condition being met. The first condition is that the source driver chip determines the target equalization gain, that is, the source driver chip completes automatic equalization. In some embodiments, the first condition includes other condition, which is not limited in the embodiments of the present disclosure.

In some embodiments, upon determining the target equalization gain, the source driver chip notifies the timing controller of determination of the target equalization gain by sending predetermined equalization gain prompt information to the timing controller. In some embodiments, the source driver chip notifies the timing controller of determination of the target equalization gain in other ways, which is not limited in the embodiments of the present disclosure.

In S205, the source driver chip receives the display data from the timing controller.

It should be noted that, the display data received from the timing controller can suffer from signal attenuation in transmitting.

In S206, the source driver chip performs gain compensation on the received display data based on the target equalization gain.

In the embodiments of the present disclosure, upon receiving the display data, the source driver chip performs gain compensation on the received display data based on the target equalization gain, thereby ensuring the display quality.

In summary, in the embodiments of the present disclosure, the source driver chip performs automatic equalization based on the equalization matching data from the timing controller. Even if attenuation degree of the signal received by the source driver chip changes due to continuous change of the temperature of the display panel, the electromagnetic interference of the environment, and the like, the changes can be compensated adaptively by automatic equalization, thereby ensuring the display quality. In addition, in the embodiments of present disclosure, the timing controller transmits the equalization matching data upon sending the link stable pattern. That is, the automatic equalization is performed in the stabilized link state, such that the property of automatic equalization is ensured.

In addition, in the embodiments of the present disclosure, the transition density of the clock calibration data is smaller, that is, the signal for carrying the clock calibration data is relatively stationary and regular, which is beneficial to the property of clock calibration. The transition density of the equalization matching data is greater, and thus it is more prone to occur an error in transmitting. The transmission of such equalization matching data can simulate or reflect a case of poor signal quality, such that the property of automatic equalization is better. The transition density of the link stable pattern is moderate, such that inaccurately automatic equalization caused by instantaneously decreasing of the circuit property of the source driver chip due to the sharp change of transition density is avoided.

Furthermore, the link stable pattern is sent between the clock calibration data and the equalization matching data, such that the sharp change of the transition density is avoided, thereby ensuring a smooth transition of the transition densities of the signals received by the source driver chip, and improving the property or the result of the automatic equalization. In addition, in the case that the timing controller transmits the equalization matching data prior to sending the link stable pattern, due to the situations that the link state is not stabilized, and the equalization matching data is prone to occur an error in transmitting, an error rate of the equalization matching data received by the source driver chip in such case is likely to be significantly greater than an error rate of the display data received in the stabilized link state. Thus, the automatic equalization performed in this case of unstabilized link state cannot simulate or reflect the link state when the display data is actually transmitting, and thus the property of automatic equalization is poor. In consideration of these factors, in the embodiments of the present disclosure, the timing controller transmits the equalization matching data after sending the link stable pattern, such that the equalization matching data is transmitted in the stabilized link state. In this way, the error situation of the equalization matching data in transmitting can reflect the link state in the actual display data transmission, and thus the property/quality of automatic equalization is improved.

All the above optional technical solutions can be combined to form alternative embodiments of the present disclosure, which are not repeated in the embodiments of the present disclosure.

Figure 5:
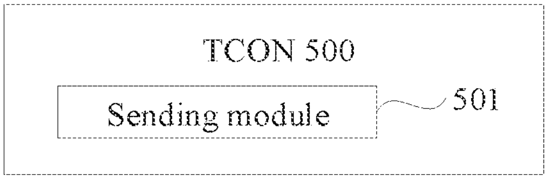
FIG. 5 is a schematic diagram of a structure of a timing controller according to some embodiments of the present disclosure.

FIG. 5 is a schematic diagram of a structure of a timing controller 500 according to some embodiments of the present disclosure. The timing controller 500 achieves part or all of the drive circuit in the display device by a software, a hardware, or combination thereof. Referring to FIG. 5, the timing controller 500 includes: a sending module 501.

The sending module 501 is configured to transmit equalization matching data to a source driver chip upon sending a link stable pattern to the source driver chip, wherein the equalization matching data is configured for the source driver chip to determine a target equalization gain, and perform gain compensation, based on the target equalization gain, on display data from the timing controller.

The sending module 501 is further configured to transmit the display data to the source driver chip in response to a first condition being met, wherein the first condition is that the source driver chip determines the target equalization gain.

In some embodiments, a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is transmitted, prior to transmitting the link stable pattern, by the timing controller to the source driver chip.

In some embodiments, the equalization matching data is transmitted by the timing controller upon being powered on or reset prior to transmitting the display data to the source driver chip.

In some embodiments, the equalization matching data is transmitted each time the timing controller transmits M frames of display data to the source driver chip, wherein M is an integer greater than 0.

In some embodiments, the sending module 501 is further configured to:

send a first control instruction to the source driver chip prior to transmitting the equalization matching data to the source driver chip, wherein the first control instruction instructs the source driver chip to perform automatic equalization; and/or send a second control instruction to the source driver chip upon transmitting the equalization matching data to the source driver chip, wherein the second control instruction indicates completion of transmission of the equalization matching data.

In some embodiments, the sending module 501 is further configured to:

send, upon transmitting clock calibration data to the source driver chip, configuration information to the source driver chip over a data channel, wherein the configuration information is provided for the source driver chip to configure a physical layer parameter.

In the embodiments of the present disclosure, the source driver chip performs automatic equalization based on the equalization matching data from the timing controller. Even if attenuation degree of the signal received by the source driver chip changes due to continuous change of the temperature of the display panel, the electromagnetic interference of the environment, and the like, the changes can be handled by automatic equalization, thereby ensuring the display quality. In addition, in the embodiments of the present disclosure, the timing controller transmits the equalization matching data upon sending the link stable pattern. That is, the automatic equalization is performed in the stabilized link state, such that the property of automatic equalization is ensured.

It should be noted that, when the timing controller in the above embodiments transmits data, division of the above functional modules is merely used as an example. In actual applications, the foregoing functions can be achieved by different functional modules as required. That is, the internal structure of the device is divided into different functional modules to achieve all or part of the functions described above. In addition, the timing controller in the above embodiments and the method for transmitting data in the above embodiments belong to the same concept, and the specific implementation process is detailed in the method embodiments, which are not repeated herein.

Figure 6:
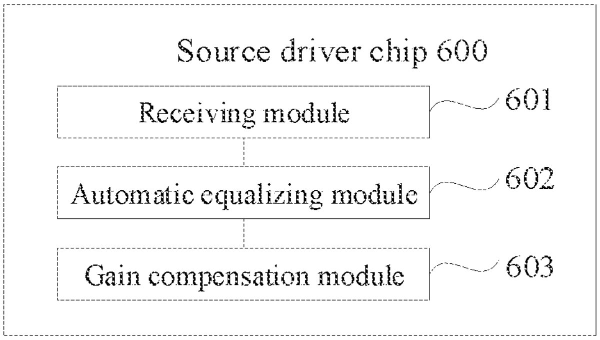
FIG. 6 is a schematic diagram of a structure of a source driver chip according to some embodiments of the present disclosure.

FIG. 6 is a schematic diagram of a structure of a source driver chip 600 according to some embodiments of the present disclosure. The source driver chip 600 achieves part or all of the drive circuit in the display device by a software, a hardware, or combination thereof. Referring to FIG. 6, the source driver chip 600 includes: a receiving module 601, an automatic equalizing module 602, and a gain compensation module 603.

The receiving module 601 is configured to receive equalization matching data from a timing controller upon receiving a link stable pattern.

The automatic equalizing module 602 is configured to determine a target equalization gain by performing automatic equalization based on the equalization matching data.

The receiving module 601 is further configured to receive display data from the timing controller.

The gain compensation module 603 is configured to perform gain compensation on the display data based on the target equalization gain.

In some embodiments, a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is received by the source driver chip prior to receiving the link stable pattern.

In some embodiments, the automatic equalizing module 602 is configured to:

acquire a plurality of gain compensated equalization matching data by performing gain compensation on the equalization matching data based on a plurality of reference equalization gains;

determine error rates of the plurality of gain compensated equalization matching data;

and determine the target equalization gain from the plurality of reference equalization gains based on the error rates of the plurality of gain compensated equalization matching data.

In some embodiments, the automatic equalizing module 602 is further configured to:

receive equalization gain configuration information from the timing controller; and determine the plurality of reference equalization gains based on the equalization gain configuration information.

In some embodiments, the equalization gain configuration information includes N bit data, and a number of the plurality of reference equalization gains is equal to or less than 2 to the power of N, wherein N is an integer greater than 0.

In some embodiments, the receiving module 601 is further configured to:

receive, upon receiving clock calibration data, configuration information from the timing controller over a data channel, wherein the configuration information is provided for the source driver chip to configure a physical layer parameter.

In the embodiments of the present disclosure, the source driver chip performs automatic equalization based on the equalization matching data from the timing controller. Even if attenuation degree of the signal received by the source driver chip changes due to continuous change of the temperature of the display panel, the electromagnetic interference of the environment, and the like, the changes can be handled by automatic equalization, thereby ensuring the display quality. In addition, in the embodiments of the present disclosure, the timing controller transmits the equalization matching data upon sending the link stable pattern. That is, the automatic equalization is performed in the stabilized link state, such that the property of automatic equalization is ensured.

It should be noted that, when the source driver chip in the above embodiments transmits data, division of the above functional modules is merely used as an example. In actual applications, the foregoing functions can be achieved by different functional modules as required. That is, the internal structure of the device is divided into different functional modules to achieve all or part of the functions described above. In addition, the source driver chip in the above embodiments and the method for transmitting data in the above embodiments belong to the same concept, and the specific implementation process is detailed in the method embodiments, which are not repeated herein.

Figure 7:
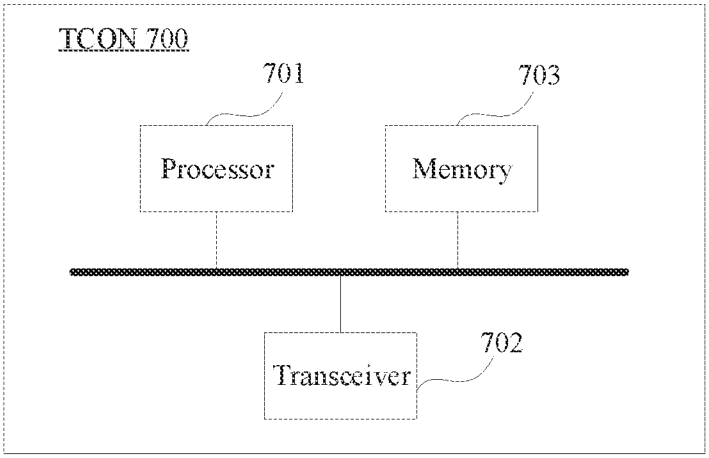
FIG. 7 is a schematic diagram of a structure of another timing controller according to some embodiments of the present disclosure.

FIG. 7 is a schematic diagram of a structure of a timing controller 700 according to some embodiments of the present disclosure. As shown in FIG. 7, the timing controller 700 includes: a processor 701, a transceiver 702, and a memory 703.

The processor 701 is practiced by at least one hardware form of digital signal processing (DSP), field-programmable gate array (FPGA), or programmable logic array (PLA).

The transceiver 702 is configured to receive or send a signal.

The memory 703 includes one or more computer-readable storage mediums. The computer-readable storage medium is non-transitory or non-volatile. In some embodiments, the non-transitory computer-readable storage medium in the memory 703 is configured to store at least one instruction. The processor 701, when loading and executing the at least one instruction, is caused to control the transceiver 702 to perform the method for transmitting data in the embodiments of the present disclosure.

It can be understood by those skilled in the art that the structure shown in FIG. 7 is not intended to define the timing controller 700, which may include more or less components, combine with some components, or dispose components in a different manner.

Figure 8:
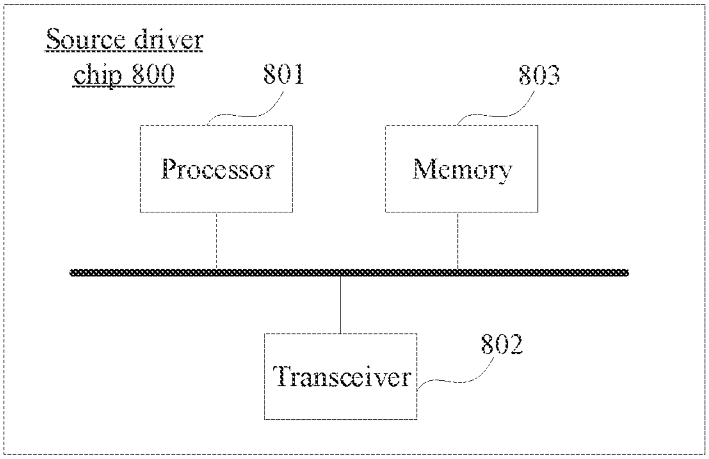
FIG. 8 is a schematic diagram of a structure of another source driver chip according to some embodiments of the present disclosure.

FIG. 8 is a schematic diagram of a structure of a source driver chip 800 according to some embodiments of the present disclosure. As shown in FIG. 8, the source driver chip 800 includes: a processor 801, a transceiver 802, and a memory 803.

The processor 801 is practiced by at least one hardware form of DSP, FPGA, or PLA.

The transceiver 802 is configured to receive or send a signal.

The memory 803 includes one or more computer-readable storage mediums. The computer-readable storage medium is non-transitory or non-volatile. In some embodiments, the non-transitory computer-readable storage medium in the memory 803 is configured to store at least one instruction. The processor 801, when loading and executing the at least one instruction, is caused to control the transceiver 802 to perform the method for transmitting data in the embodiments of the present disclosure.

It can be understood by those skilled in the art that the structure shown in FIG. 8 is not intended to define the source driver chip 800, which may include more or less components, combine with some components, or dispose components in a different manner.

In some embodiments, a computer-readable storage medium is further provided. The computer-readable storage medium stores one or more computer programs therein. The one or more computer programs, when loaded and run by a processor, cause the processor to perform the processes of the method for transmitting data in the above embodiments. For example, the computer-readable storage medium is a read-only memory (ROM), a random access memory (RAM), an optical disc, a magnetic tape, a floppy disk, an optical data storage device, or the like.

It should be noted that, the computer-readable storage medium in the embodiments of the present disclosure may be a non-volatile storage medium. In other word, the computer-readable storage medium in the embodiments of the present disclosure may be a non-transitory storage medium.

It should be noted that, all or some processes in the above embodiments are practiced by a software, a hardware, a firmware, or any combination thereof. When the processes are practiced by the software, the processes are practiced in a form of a computer program product. The computer program product includes one or more computer instructions stored in the above computer-readable storage medium.

That is, in some embodiments, a computer program product including one or more instructions is further provided. The one or more instructions, when loaded and executed by a computer, cause the computer to perform the processes of the above method for transmitting data.

It should be noted that, the term "at least one" herein refers to one or more, and the term "a plurality of" refers to two or more. Unless expressly limited otherwise, the symbol "/" indicates an "or" relationship in the description of the embodiments of the present disclosure. For example, A/B indicate A or B. The term "and/or" in the context may indicate the associated relationship of the associated objects, and indicate three relationships. For example, A and/or B may indicate: A alone, A and B, and B alone. In addition, for clear description of the technical solutions of the embodiments of the present disclosure, the terms "first" and "second" are used to distinguish the same or similar objects with substantially the same functions and uses in embodiments of the present disclosure. It can be understood by those skilled in the art that the terms “first” and “second” are not intended to limit numbers and sequences, and are not necessarily different.

It should be noted that, information (including, but not limited to, user device information, user personal data, and the like), data (including, but not limited to, data for analyzing, stored data, displayed data, and the like), and signal in the embodiments of the present disclosure are authorized by the user or sufficiently authorized by the parties. Collection, use, and processing of the related data should comply with corresponding legal regulation and standards of corresponding countries and regions. For example, the display data and the like in the embodiments of the present disclosure are acquired with sufficient authorization.

Described above are the embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for transmitting data, applicable to a timing controller, the method comprising:

transmitting equalization matching data to a source driver chip upon sending a link stable pattern to the source driver chip, wherein the equalization matching data is configured for the source driver chip to determine a target equalization gain, and perform gain compensation, based on the target equalization gain, on display data from the timing controller; and transmitting the display data to the source driver chip in response to a first condition being met, wherein the first condition is that the source driver chip determines the target equalization gain, wherein a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is transmitted, prior to transmitting the link stable pattern, by the timing controller to the source driver chip.

2. The method according to claim 1, wherein the equalization matching data is transmitted by the timing controller upon being powered on or reset prior to transmitting the display data to the source driver chip.

3. The method according to claim 1, wherein the equalization matching data is transmitted by the timing controller upon being powered on or reset prior to transmitting the display data to the source driver chip.

4. The method according to claim 1, wherein the equalization matching data is transmitted each time the timing controller transmits M frames of display data to the source driver chip, wherein M is an integer greater than 0.

5. The method according to claim 1, wherein the equalization matching data is transmitted each time the timing controller transmits M frames of display data to the source driver chip, wherein M is an integer greater than 0.

6. The method according to claim 2, wherein the equalization matching data is transmitted each time the timing controller transmits M frames of display data to the source driver chip, wherein M is an integer greater than 0.

7. The method according to claim 1, wherein prior to transmitting the equalization matching data to the source driver chip, the method further comprises:

sending a first control instruction to the source driver chip, wherein the first control instruction instructs the source driver chip to perform automatic equalization; and/or upon transmitting the equalization matching data to the source driver chip, the method further comprises:

sending a second control instruction to the source driver chip, wherein the second control instruction indicates completion of transmission of the equalization matching data.

8. The method according to claim 1, further comprising:

sending, upon transmitting clock calibration data to the source driver chip, configuration information to the source driver chip over a data channel, wherein the configuration information is provided for the source driver chip to configure a physical layer parameter.

9. A timing controller, comprising: a processor, a transceiver, and a memory; wherein the memory stores one or more instructions executable by the processor; and the processor, when loading and executing the one or more instructions, is caused to control the transceiver to perform the method as defined in claim 1.

10. A non-transitory computer-readable storage medium, storing one or more computer programs therein, wherein the one or more computer programs, when loaded and run by a processor, cause the processor to perform the method as defined in claim 1.

11. The timing controller according to claim 9, wherein the method further comprises: sending, upon transmitting clock calibration data to the source driver chip, configuration information to the source driver chip over a data channel, wherein the configuration information is provided for the source driver chip to configure a physical layer parameter; and, prior to transmitting the equalization matching data to the source driver chip, the method further comprises: sending a first control instruction to the source driver chip, wherein the first control instruction instructs the source driver chip to perform automatic equalization; and/or upon transmitting the equalization matching data to the source driver chip, the method further comprises: sending a second control instruction to the source driver chip, wherein the second control instruction indicates completion of transmission of the equalization matching data.

12. A method for transmitting data, applicable to a source driver chip, the method comprising:

receiving equalization matching data from a timing controller upon receiving a link stable pattern;

determining a target equalization gain by performing automatic equalization based on the equalization matching data;

receiving display data from the timing controller; and performing gain compensation on the display data based on the target equalization gain, wherein a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is received by the source driver chip prior to receiving the link stable pattern.

13. The method according to claim 12, wherein determining the target equalization gain by performing the automatic equalization based on the equalization matching data comprises:

acquiring a plurality of gain compensated equalization matching data by performing gain compensation on the equalization matching data based on a plurality of reference equalization gains;

determining error rates of the plurality of gain compensated equalization matching data; and determining the target equalization gain from the plurality of reference equalization gains based on the error rates of the plurality of gain compensated equalization matching data.

14. The method according to claim 12, wherein determining the target equalization gain by performing automatic equalization based on the equalization matching data comprises:

acquiring a plurality of gain compensated equalization matching data by performing gain compensation on the equalization matching data based on a plurality of reference equalization gains;

determining error rates of the plurality of gain compensated equalization matching data; and determining the target equalization gain from the plurality of reference equalization gains based on the error rates of the plurality of gain compensated equalization matching data.

15. The method according to claim 13, wherein prior to performing gain compensation on the equalization matching data based on the plurality of reference equalization gains, the method further comprises:

receiving equalization gain configuration information from the timing controller; and determining the plurality of reference equalization gains based on the equalization gain configuration information.

16. The method according to claim 12, further comprising:

receiving, upon receiving clock calibration data, configuration information from the timing controller over a data channel, wherein the configuration information is provided for the source driver chip to configure a physical layer parameter.

17. A source driver chip, comprising: a processor, a transceiver, and a memory; wherein the memory stores one or more instructions executable by the processor; and the processor, when loading and executing, the one or more instructions, is caused to control the processor and the transceiver to perform the method as defined in claim 12.

18. A non-transitory computer-readable storage medium, storing one or more computer programs therein, wherein the one or more computer programs, when loaded and run by a processor, cause the processor to perform the method as defined in claim 12.

19. The source driver chip according to claim 17, wherein the method further comprises:

receiving, upon receiving clock calibration data, configuration information from the timing controller over a data channel, wherein the configuration information is provided for the source driver chip to configure a physical layer parameter.

20. A system for transmitting data, comprising: a timing controller and a source driver chip; wherein the timing controller is configured to: transmit equalization matching data to a source driver chip upon sending a link stable pattern to the source driver chip, wherein the equalization matching data is configured for the source driver chip to determine a target equalization gain, and perform gain compensation, based on the target equalization gain, on display data from the timing controller; and transmit the display data to the source driver chip in response to a first condition being met, wherein the first condition is that the source driver chip determines the target equalization gain; and the source driver chip is configured to: receive equalization matching data from a timing controller upon receiving a link stable pattern; determine a target equalization gain by performing automatic equalization based on the equalization matching data; receive display data from the timing controller; and perform gain compensation on the display data based on the target equalization gain;

wherein a number of clock edges in a unit time in a signal for carrying the equalization matching data is greater than a number of clock edges in the unit time in a signal for carrying the link stable pattern, and the number of the clock edges in the unit time in the signal for carrying the link stable pattern is greater than a number of clock edges in the unit time in a signal for carrying clock calibration data, wherein the clock calibration data is transmitted, prior to transmitting the link stable pattern, by the timing controller to the source driver chip.

* * * * *